(12) United States Patent
Schmidt et al.

(10) Patent No.: US 10,214,633 B2
(45) Date of Patent: Feb. 26, 2019

(54) TIRE WITH TREAD INTENDED FOR OFF-THE-ROAD SERVICE

(71) Applicant: The Goodyear Tire & Rubber Company, Akron, OH (US)

(72) Inventors: Ryan Michael Schmidt, Copley, OH (US); Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 52 days.

(21) Appl. No.: 15/270,689

(22) Filed: Sep. 20, 2016

(65) Prior Publication Data

US 2018/0079892 A1 Mar. 22, 2018

(51) Int. Cl.
| | | |
|---|---|---|
| *C08K 9/06* | (2006.01) | |
| *C08K 3/04* | (2006.01) | |
| *C08K 5/20* | (2006.01) | |
| *C08L 7/00* | (2006.01) | |
| *C08L 9/00* | (2006.01) | |
| *C08K 3/36* | (2006.01) | |

(52) U.S. Cl.
CPC .................. *C08K 9/06* (2013.01); *C08K 3/04* (2013.01); *C08K 5/20* (2013.01); *C08L 7/00* (2013.01); *C08L 9/00* (2013.01); *C08K 3/36* (2013.01)

(58) Field of Classification Search
CPC ... C08K 3/04; C08K 3/36; C08K 5/20; C08K 9/06; C08L 7/00; C08L 9/00
See application file for complete search history.

(56) References Cited

U.S. PATENT DOCUMENTS

| | | | |
|---|---|---|---|
| 6,573,324 B1 | 6/2003 | Cohen et al. | 524/492 |
| 6,735,447 B1 | 5/2004 | Muller | 455/522 |
| 6,936,669 B2 | 8/2005 | Halasa et al. | 526/260 |
| 7,368,587 B2 | 5/2008 | Cohen | 556/427 |
| 2007/0187012 A1* | 8/2007 | Sandstrom | B60C 11/02 152/209.1 |
| 2017/0022352 A1 | 1/2017 | Kamada | |

FOREIGN PATENT DOCUMENTS

| | | |
|---|---|---|
| CN | 106916348 A | 7/2017 |
| EP | 2218750 A1 | 8/2010 |
| EP | 2644650 B1 | 10/2017 |
| JP | 2004292678 | 10/2004 |
| WO | 03091324 A1 | 11/2003 |
| WO | 2012032896 A1 | 3/2012 |
| WO | 2016061300 A1 | 4/2016 |

OTHER PUBLICATIONS

EPO search report dated Dec. 28, 2017.

* cited by examiner

*Primary Examiner* — Edward J Cain
(74) *Attorney, Agent, or Firm* — Henry C. Young, Jr.

(57) ABSTRACT

This invention relates to heavy duty pneumatic rubber tires with treads intended for use on diverse surfaces, particularly for off-the-road service.

8 Claims, No Drawings

TIRE WITH TREAD INTENDED FOR OFF-THE-ROAD SERVICE

FIELD OF THE INVENTION

This invention relates to heavy duty pneumatic rubber tires with treads intended for use on diverse surfaces, particularly for off-the-road service.

BACKGROUND OF THE INVENTION

Pneumatic tires are sometimes intended for heavy duty use such as example for hauling and for traveling over uneven ground when carrying heavy loads which might be referred to as being off-the-road service. Exemplary of such tires are medium truck tires such as, for example, dump trucks and waste haul trucks.

However, sometimes such pneumatic tires are also intended for such heavy duty use to be driven on diverse surfaces including a combination of both roadways and also off-the-road conditions which present more severe use conditions for the tires.

A combination of such intended diverse mixed service use conditions presents significant challenges for rubber compositions for treads of such tires. A balanced combination of improving abrasion resistance properties for the tread rubber while maintaining other physical properties is sometimes difficult to obtain. Here, a methodology of achieving such result is to be evaluated, particularly for a rubber composition for a tire tread intended for such heavy duty service.

For heavy duty tire tread work, the principal (primary) elastomer used for the tread rubber composition is often natural rubber (natural cis 1,4-polyisoprene rubber). The tread rubber may contain a minor amount of cis 1,4-polybutadiene rubber to promote abrasion resistance and thereby resistance to tread wear to promote a greater vehicular driving distance relative to depth of tread worn away.

Such natural rubber-rich treads are in contrast to passenger tire treads for lighter intended duty which are expected to be driven over dedicated roadways while experiencing lower workloads and which may typically be comprised primarily of synthetic rubber such as, for example, styrene/butadiene rubber with a minor amount of cis 1,4-polybutadiene rubber which may also contain a minimal amount of natural rubber, if any.

For example, rubber compositions for natural rubber-based treads of such heavy duty tires for such mixed service may be desired which promote a relatively low hysteresis property for the tread rubber for promoting reduced internal heat buildup in the tread during tire service with a corresponding beneficial increased heat durability of the tread and predictive beneficial reduction in tire rolling resistance for better fuel economy for an associated vehicle.

For the beneficial promotion of reduction in hysteresis property for the natural rubber-based tread rubber composition, it may be thought of to employ filler reinforcement for the rubber composed of precipitated silica reinforcement with a significantly reduced content of rubber reinforcing carbon black.

However, such reduction in rubber reinforcing carbon black content for the tread rubber might be expected to promote a reduction in abrasion resistance and therefore promote a reduction in resistance to tread wear.

A challenge is therefore presented of promoting an increase in abrasion resistance without sacrificing various other physical properties of the tread rubber composition.

For such challenge it is proposed to evaluate an inclusion of a fatty acid amide in combination with precipitated silica in a form of pre-hydrophobated precipitated silica in a natural rubber based rubber composition.

Such fatty acid amides may be represented by a general formula (I):

where $R_1$ is comprised of an alkyl hydrocarbon radical containing from 12 to 36 carbon atoms, an alkenyl hydrocarbon radical containing from 12 to 36 carbon atoms or alkadiene hydrocarbon radical containing from 12 to 36 carbon atoms.

In one embodiment, the fatty acid amide may be an amide of saturated or unsaturated monovalent amines or of saturated or unsaturated polyvalent amines.

For example, the fatty acid amide may be comprised of an amide of at least one of caprylamine, lauralamine, palmitylamine, stearylamine, oleylamine, myristylamine, methylenediamine, ethylenediamine, hexamethylenediamine and ammonia.

In one embodiment, the fatty acid amide may be comprised of at least one of caprylamide, lauralamide, palmitylamide, stearylamide (stearamide), oleylamide and myristylamide.

In one embodiment, the rubber composition may contain from 1 to about 10, alternately from about 1 to about 25, parts by weight of the fatty acid amide per 100 parts by weight of the rubber (phr).

For ease of handling, the fatty acid amide may be provided as being deposited on a suitable carrier. Representative examples of such carriers may be, for example, silica, carbon black, alumina, kieselguhr, silica gel and calcium silicate.

In practice, such pre-hydrophobated precipitated silica may be a precipitated silica pretreated with at least one of bis(3-triethoxysilylpropyl) polysulfide with an average of from about 2 to about 4 connecting sulfur groups in its polysulfidic bridge or pretreated with an alkoxyorganomercaptosilane optionally together with at least one of alkylsilane and fatty acid.

Representative examples of pre-hydrophobated precipitated silica are, and not intended to be limiting, U.S. Pat. Nos. 6,573,324 and 7,368,587.

In the description of this invention, terms such as "compounded rubber", "rubber compound" and "compound", if used herein, refer to rubber compositions containing of at least one elastomer blended with various ingredients, including curatives such as sulfur and cure accelerators. The terms "elastomer" and "rubber" may be used herein interchangeably unless otherwise indicated. It is believed that such terms are well known to those having skill in such art.

DISCLOSURE AND PRACTICE OF THE INVENTION

In accordance with this invention, a rubber composition is provided which is comprised of, based on parts by weight per 100 parts by weight of elastomer (phr), (A) conjugated diene-based elastomers comprised of (1) about 80 to about 100, alternately about 90 to about 100, phr of cis 1,4-polyisoprene rubber desirably comprised of natural cis 1,4-polyisoprene rubber, and (2) from zero to about 20, alternately from 2 to about 10, phr of at least one additional diene-based synthetic elastomer comprised of cis 1,4-polybutadiene rubber and styrene/butadiene rubber, desirably cis 1,4-polybutadiene rubber, (B) about 20 to about 120, alternatively about 30 to about 100, phr of rubber reinforcing filler comprised of a combination of pre-hydrophobated precipitated silica (composite of precipitated silica pre-hydrophobated prior to its addition to the rubber composition) and rubber reinforcing carbon black, wherein said reinforcing filler is comprised of from about 5 to about 100, alternately from about 5 to about 25 phr of rubber reinforcing carbon black, and wherein said pre-hydrophobated precipitated silica is comprised of a composite of precipitated silica pre-treated with at least one of bis(3-triethoxysillylpropyl) polysulfide having an average of from about 2 to about 4 connecting sulfur atoms in its polysulfidic bridge and an alkoxyorganomercaptosilane, and (C) from about 1 to about 50, alternately from about 1 to about 10, phr of fatty acid amide, where said fatty acid amide is comprised of the general formula (I):

(I)

where $R_1$ is comprised of an alkyl hydrocarbon radical containing from 12 to 36 carbon atoms, an alkenyl hydrocarbon radical containing from 12 to 36 carbon atoms or alkadiene hydrocarbon radical containing from 12 to 36 carbon atoms.

In one embodiment, said fatty acid amide is an amide of saturated or unsaturated monovalent amines or saturated or unsaturated polyvalent amines.

In one embodiment, the fatty acid amide is comprised of an amide of at least one of caprylamine, lauralamine, palmitylamine, stearamine, oleylamine, myristylamine, methylenediamine, ethylenediamine, hexamethylenediamine and ammonia, more desirably comprised of at least one of caprylamine, lauralamine, palmitylamine, stearamine, oleylamine and myristylamine and more desirably stearamine.

Therefore, in one embodiment, the fatty acid amide may be comprised of at least one of caprylamide, lauralamide, palmitylamide, stearamide, oleylamide and myristylamide and more desirably stearamide. The term stearamide may also be referred to as stearylamide.

In further accordance with this invention, a tire is provided having a tread comprised of such rubber composition.

Precipitated silicas are synthetic amorphous silicas obtained by processes which including the acidification of a soluble silicate, for example sodium silicate and precipitation of silica aggregates therefrom.

The precipitated silica may have, for example, a BET surface area, as measured using nitrogen gas, in a range of from about 80 to about 300, although more typically in a range of about 100 to about 200, although perhaps even up to about 360, square meters per gram. Methods of measuring silica surface area with nitrogen gas is well known by those having skill in such art.

The precipitated silica may have, for example, a dibutylphthalate (DBP) absorption value in a range of about 150 to about 350, and usually about 200 to about 300 cc/100 gm.

Representative of a pre-hydrophobated precipitated silica is, for example, Agilon 400™ from PPG Industries.

In one embodiment, said styrene/butadiene rubber is comprised of an organic solution polymerization prepared styrene/butadiene rubber (S-SBR) having a bound styrene content in a range of from about 12 to about 20 percent.

In one embodiment, the styrene/butadiene rubber such as, for example, organic solution polymerization prepared styrene/butadiene rubber, may be coupled with tin or silica.

In one embodiment, the styrene/butadiene rubber, including a tin or silicon coupled styrene/butadiene rubber, may be a functionalized styrene/butadiene rubber in a sense of containing functional groups reactive with hydroxyl groups (e.g. silanol groups) on said pre-hydrophobated precipitated silica. Such coupling and functionalization of a styrene/butadiene rubber is well known to those having skill in such art.

The tin and silicon coupling of elastomers (e.g. with, for example tin or silicon tetrachloride), which are therefore tin and silicon coupled elastomers, are well known to those having skill in such art.

Such functionalized styrene/butadiene elastomer, including a tin or silicon coupled styrene/butadiene elastomer, may be functionalized by containing functional groups reactive with hydroxyl groups on the precipitated silica comprised of, for example, amine, siloxy and thiol, including siloxy/thiol, hydroxy and epoxy groups.

Representative of amine functionalized SBR elastomers are, for example, SLR4601™ from Dow Chemical and T5560™ from JSR, and in-chain amine functionalized SBR elastomers mentioned in U.S. Pat. Nos. 6,735,447 and 6,936,669.

Representative of siloxy functionalized SBR elastomers is, for example, SLR4610™ from Dow Chemical.

Representative of such combination of amine and siloxy functionalized SBR elastomers is, for example, HPR350™ from JSR.

Representative of hydroxy functionalized SBR elastomers is, for example, Tufdene 3330™ from Asahi.

Representative of epoxy functionalized SBR elastomers is, for example, Tufdene E50™ from Asahi.

For the preparation of the rubber composition, various ingredients may conventionally be used in the compounding of the rubber composition.

Exemplary rubber reinforcing carbon blacks may be found, for example, in *The Vanderbilt Rubber Handbook*, Thirteenth Edition (1990), Page 417.

Various processing aids may be used, if desired, such as for example, waxes such as microcrystalline and paraffinic waxes, in a range, for example, of about 1 to 5 phr or about 1 to about 3 phr, if used; and resins, usually as tackifiers, such as, for example, synthetic hydrocarbon and natural resins in a range of, for example, about 1 to 5 phr or about 1 to about 3 phr, if used. A curative might be classified as sulfur together with one or more sulfur cure accelerator(s). For the sulfur and accelerator(s) curatives, the amount of sulfur used may be, for example, from about 0.5 about 5 phr, more usually in a range of about 0.5 to about 3 phr;

and the accelerator(s), often of the sulfenamide type, is (are) used in a range of about 0.5 to about 5 phr, often in a range of about 1 to about 2 phr. The ingredients, including the elastomers but exclusive of sulfur and accelerator curatives, are normally first mixed together in a series of at least two sequential mixing stages, although sometimes one mixing stage might be used, to a temperature in a range of, for example, about 145° C. to about 185° C., and such mixing stages are typically referred to as non-productive mixing stages. Thereafter, the sulfur and accelerators, and possibly one or more retarders and possibly one or more antidegradants, are mixed therewith to a temperature of, for example, about 90° C. to about 120° C. and is typically referred as a productive mix stage. Such mixing procedure is well known to those having skill in such art.

After mixing, the compounded rubber can be fabricated such as, for example, by extrusion through a suitable die to form a tire tread. The tire tread is then typically built onto a sulfur curable tire carcass to form an assembly thereof and the assembly thereof cured in a suitable mold under conditions of elevated temperature and pressure by methods well known to those having skill in such art.

The invention may be further understood by reference to the following example in which the parts and percentages are by weight unless otherwise indicated.

EXAMPLE I

Rubber compositions were prepared to evaluate their use as a tread rubber for a tore intended for heavy duty use.

For such evaluation, rubber compositions were prepared to evaluate an inclusion of a fatty acid amide in a form of stearamide in a rubber composition containing reinforcing filler comprised of a pre-hydrophobated precipitated silica and rubber reinforcing carbon black.

Control rubber Sample A is a rubber composition containing a pre-hydrophobated precipitated silica prepared without an inclusion of stearamide.

Experimental rubber Samples B and C were prepared in the manner of Control rubber Sample A, except with an addition of 3 and 6 phr, respectively, of stearamide.

The rubber compositions were prepared by mixing the ingredients in several stages, namely, two sequential non-productive (NP) stages (without the curatives) followed by a productive (P) mix stage (for adding the curatives).

For the non-productive mixing stages, the ingredients are mixed in an internal rubber mixer for about four minutes to a temperature of about 160° C. In the final productive mixing stage, the curatives are mixed with the rubber compositions in an internal rubber mixer to a temperature of about 110° C. for about three minutes.

The resulting rubber compositions were then vulcanized at a temperature of about 150° C. for about 30 minutes.

The following Table 1 relates to the ingredients used for the Control Sample A and Experimental Samples B and C.

TABLE 1

| | Amounts (phr, rounded) | | |
| --- | --- | --- | --- |
| | Control | Experimental | |
| Materials | Sample A | Sample B | Sample C |
| First non-productive mixing (NP1) | | | |
| Natural rubber[1] | 100 | 100 | 100 |
| Rubber reinforcing carbon black[2] | 10 | 10 | 10 |
| Stearamide[3] | 0 | 3 | 6 |
| Antioxidant | 3 | 3 | 3 |
| Zinc oxide | 4 | 4 | 4 |
| Fatty acid[4] | 4 | 4 | 4 |
| Pre-hydrophobated Silica[5] | 40 | 40 | 40 |
| Productive mixing (P) | | | |

TABLE 1-continued

| | Amounts (phr, rounded) | | |
| --- | --- | --- | --- |
| | Control | Experimental | |
| Materials | Sample A | Sample B | Sample C |
| Sulfur | 1 | 1 | 1 |
| Accelerator(s)[6] | 1 | 1 | 1 |

[1]Natural cis 1,4-polyisoprene rubber (RSS3)
[2]N347, an ASTM designation
[3]Stearamide as Crodamide SR from the Croda Company
[4]Comprised of stearic, palmitic and oleic acids
[5]Prehydrophobated precipitated silica as Agilon 400 ™ from PPG Industries
[6]Sulfenamide and diphenylguanidine sulfur cure accelerators Various physical properties for the resulting vulcanized rubber compositions are shown in the following Table 2.

The various tests employed are considered herein to be well known to those having skill in such analytical art.

The physical properties for Control rubber Sample A are normalized to a value of 100 and the physical properties for Experimental rubber Samples B and C are presented as being relative to the normalized property values for Control rubber Sample A.

TABLE 2

| | Control | Experimental | |
| --- | --- | --- | --- |
| Materials | Sample A | Sample B | Sample C |
| Stearamide | 0 | 3 | 6 |
| Pre-hydrophobated precipitated silica | 40 | 40 | 40 |
| Rheometer, 150° C. (MDR)[1] | | | |
| Min torque (dNm) | 100 | 87 | 88 |
| T90 (minutes) | 100 | 107 | 101 |
| Stress-Strain (ATS)[2] | | | |
| Tensile strength (MPa) | 100 | 100 | 95 |
| Elongation at break (%) | 100 | 98 | 96 |
| 300% modulus, ring (MPa) | 100 | 106 | 103 |
| Storage Modulus G', 10 Hertz, 150° C. (MPa) | | | |
| 1% strain | 100 | 99 | 87 |
| 10% strain | 100 | 112 | 114 |
| 100% strain | 100 | 100 | 94 |
| Tan delta, 10 Hertz, 10% strain, 150° C. | 100 | 95 | 79 |
| Rebound 100° C. | 100 | 100 | 99 |
| Grosch rate of abrasion (High) (mg/km) (lower is better) | 100 | 84 | 73 |
| DIN abrasion[3] (lower is better) | 100 | 86 | 73 |

[1]Moving die rheometer instrument by Alpha Technologies, used for determining cure characteristics of elastomeric materials, such as for example torque, T90 etc.
[2]Automated testing system instrument by the Instron Corporation which incorporates six tests in one system. Such instrument may determine ultimate tensile, ultimate elongation and modulii, etc. Data reported in the Table is generated by running the ring tensile test.
[3]DIN-53516 reported as relative volume loss The Grosch abrasion rate run may be on an LAT-100 abrader and is measured in terms of mg/km of rubber abraded away. The test rubber sample is placed at a slip angle under constant load (Newtons) as it traverses a given distance on a rotating abrasive disk (disk from HB Schleifmittel GmbH). In practice, a low abrasion severity test may be run, for example, at a load of 20 Newtons, 2° slip angle, disk speed of 40 km/hr for a distance of 7,500 meters; a medium abrasion severity test may be run, for example, at a load of 40 Newtons, 6° slip angle, disk speed of 20 km/hr and distance of 1,000 meters; a high abrasion severity test may be run, for example, at a load of 70 Newtons, 12° slip angle, disk speed of 20 km/hr and distance of 250 meters; and an ultra high abrasion severity test may be run, for example, at a load of 70 Newtons, 16° slip angle, disk speed of 20 km/hr and distance of 500 meters.

From Table 2, it can be seen that various physical properties, such as torque, tensile strength, modulus, elongation and storage modulus G', of Experimental Samples B and C were comparable to those of the Control Sample A and therefore mostly unaffected by the addition of the stearamide.

This indicates that the addition of the stearamide can be made without loss of such cured rubber properties for the cured pre-hydrophobated precipitated silica containing natural rubber based rubber which also contained rubber reinforcing carbon black.

However, the effect of addition of the stearamide did have a significant affect relating to abrasion resistance (DIN abrasion) and rate of abrasion (Grosch abrasion rate) for Experimental rubber Samples B and C.

In particular, it is seen in Table 2, with physical properties of Control rubber Sample A normalized to values of 100, that DIN abrasion values for rubber Samples B and C were beneficially significantly reduced to relative values of 86 and 73, respectively, as the stearamide content was increased.

In particular, it is seen in Table 2, with physical properties of Control rubber Sample A normalized to values of 100, that Grosch abrasion rate values for rubber Samples B and C were beneficially significantly reduced to relative values of 84 and 73, respectively, as the stearamide content was increased.

It is therefore concluded that a significant discovery was observed by an addition of fatty acid amide, namely the stearamide, to the natural rubber based rubber composition containing the pre-hydrophobated precipitated silica filler reinforcement which provided the rubber composition with significant beneficial abrasion resistance without sacrificing other physical properties of the rubber composition.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art.

What is claimed is:

1. A rubber composition comprised of, based on parts by weight per 100 parts by weight of elastomer (phr),
   (A) conjugated diene-based elastomers comprised of:
      (1) about 80 to about 100 phr of natural cis 1,4-polyisoprene rubber, and
      (2) up to about 20 phr of additional diene-based synthetic elastomer comprised of at least one of cis 1,4-polybutadiene rubber and styrene/butadiene rubber,
   (B) about 20 to about 120 phr of rubber reinforcing filler comprised of a combination of pre-hydrobated precipitated silica and rubber reinforcing carbon black, wherein said reinforcing filler is comprised of from about 5 to about 100 phr of rubber reinforcing carbon black, and wherein said pre-hydrophobated precipitated silica is comprised of a composite of precipitated silica pre-treated prior to addition to said rubber composition with bis(3-triethoxysillylpropyl) polysulfide having an average of from about 2 to about 4 connecting sulfur atoms in its polysulfidic bridge or with an alkoxyorganomercaptosilane, and
   (C) from about 1 to about 50 phr of fatty acid amide, where said fatty acid amide is comprised of the general formula (I):

where $R_1$ is comprised of an alkyl hydrocarbon radical containing from 12 to 36 carbon atoms, an alkenyl hydrocarbon radical containing from 12 to 36 carbon atoms or alkadiene hydrocarbon radical containing from 12 to 36 carbon atoms, and wherein said styrene/butadiene rubber is at least one of:
   (1) tin or silicon coupled styrene/butadiene/butadiene rubber and
   (2) functionalized styrene/butadiene rubber containing functional groups reactive with hydroxyl groups contained on said pre-hydrophobated silica.

2. The rubber composition of claim 1 wherein said rubber composition contains said styrene/butadiene rubber, wherein said styrene/butadiene rubber is a functionalized styrene/butadiene rubber containing functional groups reactive with hydroxyl groups on said pre-hydrophobated silica and wherein said fatty acid amide is comprised of at least one of caprylamide, lauralamide, palmitylamide, stearamide, oleylamide and myristylamide.

3. The rubber composition of claim 2 wherein said functional groups are comprised of at least one of amine, siloxy, thiol, hydroxyl and epoxy groups.

4. The rubber composition of claim 1 wherein said rubber composition contains said styrene/butadiene rubber wherein said styrene/butadiene rubber is a tin or silicon coupled styrene/butadiene rubber and wherein said fatty acid amide is comprised of at least one of caprylamide, lauralamide, palmitylamide, stearamide, oleylamide and myristylamide.

5. The rubber composition of claim 4 wherein said styrene/butadiene rubber is a functionalized styrene/butadiene rubber containing functional groups reactive with hydroxyl groups on said pre-hydrophobated silica where said functional groups are comprised of at least one of amine, siloxy, thiol, hydroxyl and epoxy groups.

6. A tire having a tread of the rubber composition of claim 1.

7. A tire having a tread of the rubber composition of claim 2.

8. A tire having a tread of the rubber composition of claim 5.

* * * * *